Nov. 18, 1941.                R. W. CLIFFORD                2,262,834
                                  VALVE
                            Filed June 25, 1940
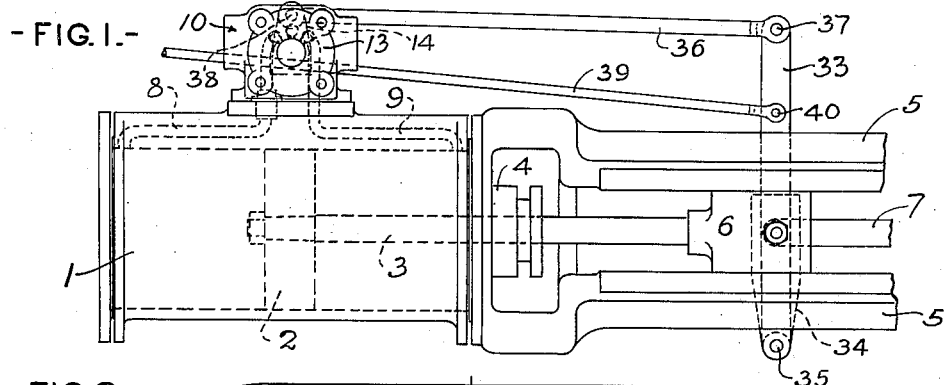
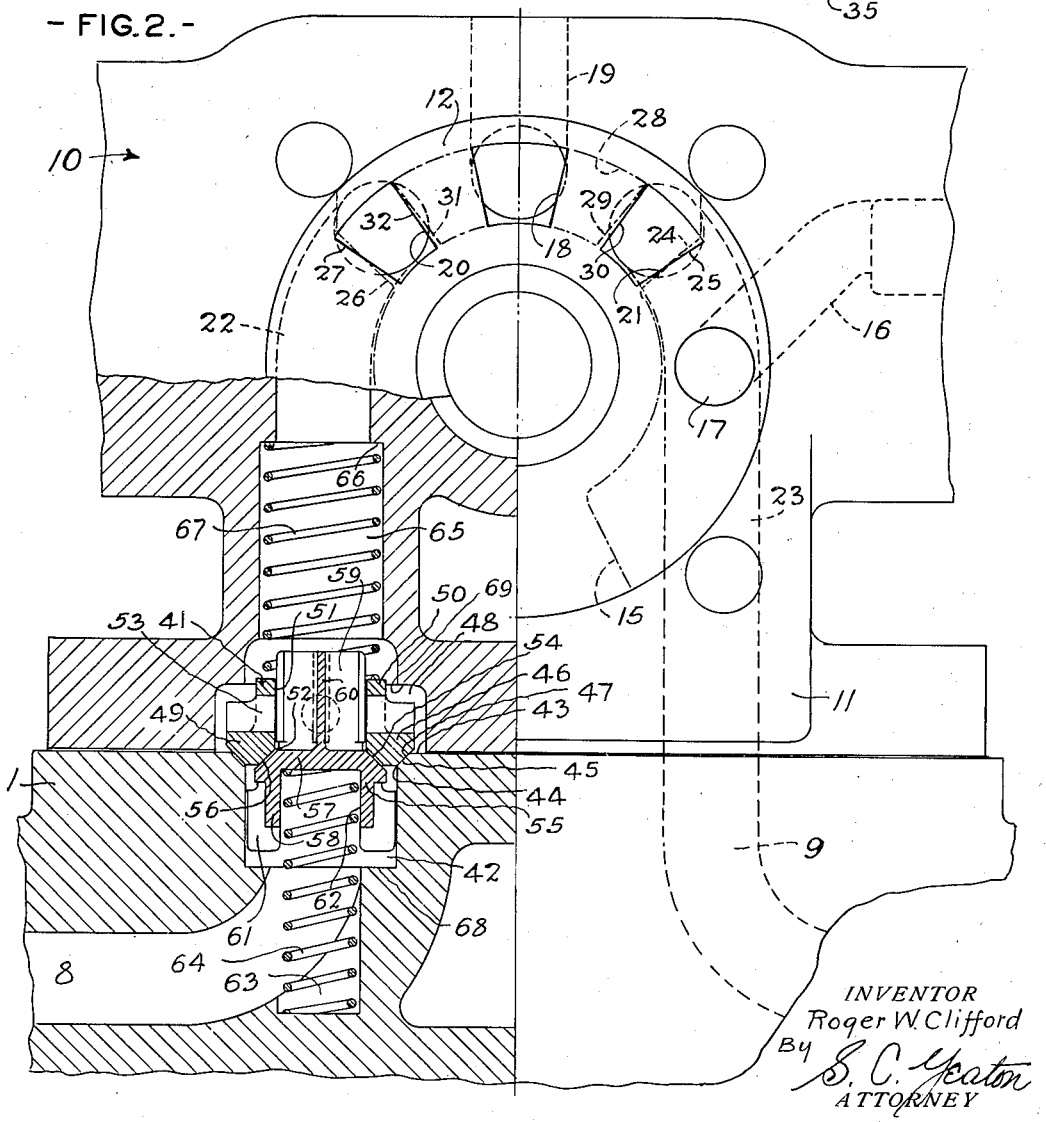
INVENTOR
Roger W. Clifford
By S. C. Yeaton
ATTORNEY Patented Nov. 18, 1941

2,262,834

UNITED STATES PATENT OFFICE 2,262,834

VALVE

Roger W. Clifford, Schenectady, N. Y., assignor to American Locomotive Company, New York, N. Y., a corporation of New York Application June 25, 1940, Serial No. 342,212

3 Claims. (Cl. 121—38)

This invention relates to valves and more particularly to valves for a power reverse gear mechanism for a locomotive.

An object of this invention is to provide a pressure-reducing valve for a passageway permitting fluid flow therethrough in opposite directions.

A further object is to provide a valve that will effect equalization of total pressures on opposite sides of the piston of a reverse gear mechanism to compensate for the loss in piston area on the piston rod side of the piston due to the cross-sectional area of the rod.

Other and further objects of and advantages achieved by the present invention will be apparent from the following description of an approved embodiment thereof and the claims appended hereto.

Referring to the drawing forming part of this application, Figure 1 is a fragmentary diagrammatic front elevation of a power reverse gear mechanism involving the present invention; and Fig. 2 is an enlarged view, partly in section to better show the valve of the present invention, and partly in side elevation, of a portion of the mechanism shown in Fig. 1, the valve element being shown in dot and dash lines.

A servo-motor is employed in the power reverse gear mechanism in the present instance, of the follow-up type. The piston of the mechanism is adjusted to any desired position by power fluid such as steam or air, usually compressed air, and this is supplied to and exhausted from the cylinder containing the piston by a control valve, controlled by the engineer through the operation of a lever in the locomotive cab, which lever is connected to the control valve by means of a reach rod. The mechanism is, of course, for setting the distribution valve gear of a locomotive to adjust the point of cut-off or to reverse the travel of the locomotive. These results are accomplished by movement of the lever to the appropriate position where it is temporarily secured.

Assuming compressed air is employed in the mechanism, such movement of the lever operates the control valve of the mechanism to admit compressed air to one side of the piston and to exhaust it from the other side. The piston is thus moved to adjust the distribution valve gear. When the lever has been moved to the required position to attain the desired adjustment and secured therein, the piston, through its further movement, returns the control valve to its normal all-port-closed or inactive position. It will be understood that at this normal position of the control valve one or both of the ports leading to opposite ends of the cylinder may be partially open to provide a "lead" through which air passes to one or both sides of the piston, as will presently appear.

In the present follow-up type of motor the various movements of the control valve produced by the lever in the cab and by the movement of the piston are accomplished by the functioning of a floating lever operatively connected to the control valve, the piston, and the lever in the cab.

When the piston comes to rest at a position corresponding to the particular desired setting of the lever in the cab, with the control valve returned to its all-port-closed position, the air pressures on each side of the piston become balanced. However, as the piston is only held in position by this elastic air pressure, it is comparatively easily moved, and such movement often takes place under locomotive running conditions, such for instance as vibration of the locomotive, forces exerted by the distribution valve gear, and for various other reasons. Such movements of the piston force the distribution valve gear out of proper setting, but this is only for an instant because the piston movement simultaneously effects movement of the control valve which results in an air control that immediately restores the piston to its proper position. While this displacement is only for an instant, as aforesaid, it nevertheless occurs quite frequently.

The piston rod, due to its cross-sectional area, tends to produce a total pressure-unbalancing effect upon the opposite sides of the piston, which is compensated for to restore balance by reducing the pressure per square inch on the side of the piston opposite the piston rod sufficiently to compensate for the loss in effective piston area due to the rod.

In a reverse gear mechanism of the present type, the air, as it passes through each port controlled by the control valve to each end of the cylinder, is at the same pressure (that is it comes from a common source of supply). This produces a greater total pressure on the side of the piston opposite the piston rod side and after the port is closed to admission on this side of greater pressure, the piston continues to move in the direction of the piston rod until the air in this closed end of the cylinder becomes sufficiently expanded to establish a balance of total pressure on both sides of the piston. This usually produces a considerable valve lap of the port to the cylinder end opposite the piston rod end and a slight opening or lead of the port to the piston rod end of the cylinder, although this latter condition of port opening or lead will depend upon the design of the control valve. The lap tends to give stability to the operation of the mechanism; nevertheless locomotive vibration or other causes will often cause piston movement, destroying the lap until readjustment has taken place in the manner already described. Attempt has thus far been made, with more or less fullness, to describe a conventional type of reverse gear mechanism.

The present invention is directed to reducing the pressure per square inch upon the side of the piston opposite the piston rod side to compensate for the loss in effective piston pressure area caused by the presence of the piston rod, thereby establishing a balanced total pressure on each side of the piston, and to the maintaining of this balance even though forces are present that would otherwise disturb it, as for instance forces that would overcome the lap, causing partial port opening and leaking of air to the cylinder end opposite the piston rod end. To this end the valve of the present invention operates in the nature of a pressure-reducing valve so that from a common source of air supply air may be admitted to the cylinder at the piston rod end thereof at source pressure per square inch, and air may be admitted to the opposite end of the cylinder at a reduced pressure per square inch to the end that a balanced total pressure may be maintained on both sides of the piston.

There are various known control valve arrangements, forming parts of various reverse gear conventional mechanisms, for admitting air to and exhausting air from the reverse gear cylinder. For instance there may be an admission valve and separate exhaust valves. This is a matter of choice, and the present invention is not limited in this particular although by way of exemplification a single control valve is employed for both admission and exhaust. A further characteristic of the exemplified conventional control valve is that the air is admitted to and exhausted from an end of the cylinder through a single passageway. It is a requirement of the present invention that the air pass through a single passageway in passing to and passing from an end of the cylinder, and the pressure-reducing valve of the invention is devised to permit this. The valve may accordingly aptly be termed a pressure-reducing double flow valve.

The power reverse gear mechanism with which the invention is illustrated is, generally speaking, of a conventional type as aforesaid, and in view of what has already been stated and of the well-known characteristics of the mechanism it is believed only a brief further description thereof is necessary.

The mechanism comprises a power cylinder 1, piston 2 disposed therein, piston rod 3 extending from the piston through one end of the cylinder only, stuffing box 4 for the piston rod, crosshead guides 5 secured to the cylinder end adjacent the piston rod, crosshead 6 slidable in the guides, reach rod 7 pivoted to the crosshead, and air passageways 8 and 9 formed in the cylinder casting. The reach rod 7 is connected to the arm of a distribution valve gear reverse shaft (not shown) in the usual manner for adjustment of the distribution valve gear by the adjustment of the piston 2 in the manner already described.

The valve for controlling the piston is indicated generally by the reference numeral 10. It is of a conventional type except as modified by the present invention, and by my copending application Serial No. 302,654, filed November 3, 1939, now abandoned, to which copending application reference may be had for a fuller understanding of the control valve of the mechanism and in fact of the power reverse gear mechanism also. While the modified valve of said copending application is here shown it will be understood that it is in no way essential to the carrying out of the present invention.

The valve 10 comprises a block 11 secured on the top of the cylinder 1. The block is provided with a vertical valve seat 12 covered by a cap 13 bolted to the block and providing an air chest between the seat and cap. The block is orificed transversely horizontally at the center of the seat for a valve stem (not shown). The stem extends beyond the block at the rear side thereof and has secured thereon a rocker arm 14. A valve element 15, indicated in dot and dash lines in Fig. 2, is mounted on the inner end of the stem with its inner or rear face in engagement with the seat 12.

The block has a passageway 16 opening at one end through the side of the block and connected to a source of compressed air supply (not shown), and open at the other end through a port 17 for supplying air to the control valve. The port 17 is beyond the valve element 15 so that the air can be continually supplied to the valve chest.

There are three other ports. These are of keystone shape and are disposed in the seat 12. The ports comprise a middle port 18 which is connected to the exterior by a passageway 19, and two other ports 20 and 21 connected respectively with the passageways 8 and 9. The port 20 is connected to the passageway 8 through a passageway 22, later to be more fully described, and the port 21 is connected to the passageway 9 through a passageway 23. The passageways 19, 22 and 23 are formed in the block 11.

The valve element 15 has an edge 24 for coaction with the edge 25 of port 21, and an edge 26 for coaction with the edge 27 of port 20, whereby compressed air will be supplied to one or the other end of the cylinder, depending upon the direction in which the valve element is swung.

The valve element 15 is provided at its inner face with a depression or recess 28 which at all times covers, and is in communication with the port 18. The depression 28 has an edge 29 for coaction with the edge 30 of port 21, and an edge 31 for coaction with the edge 32 of port 20, whereby air will be exhausted from one or the other end of the cylinder, depending upon the direction in which the valve element is swung, the air passing from the port 20 or 21, as the case may be, into the depression 28 and out to the atmosphere through the port 18 and passageway 19. The coacting edges of the valve element 15 and the ports are so disposed that upon admission of compressed air to one end of the cylinder there will substantially simultaneously be air exhausted from the other end of the cylinder. While the coacting edges are given relative angularities according to the aforesaid copending application, further description of the these edges is not considered necessary, as a control valve having convention coacting edges may be employed.

The conventional power reverse gear mechanism further comprises a floating lever 33 which is instrumental in effecting the various swinging movements of the valve element 15, an arm 34, which depends from the cross head 6 and to which the floating lever at its lower end is pivotally connected by a pivot pin 35, floating lever connecting link 36, which is pivotally connected at one end to the upper end of the floating lever by pivot pin 37, and at its opposite end to the upper end of the arm 14 by pivot pin 38, and a reach rod 39 pivoted to the lever 33 intermediate its ends by pivot pin 40 and at its other end pivotally connected to the cab control lever, as aforesaid (not shown).

Without further description of the operation of the mechanism it will suffice to say that the valve element 15 is swung by the cab lever, that is to say by the reach rod 39, through swinging of the floating lever 33 about the pin 35 as a center, and is swung by the piston through swinging of the floating lever 33 about the pin 40 as a center.

The fluid pressure-reducing double flow valve of the present invention is for employment in a passageway for pressure fluid, as for instance steam or compressed air, wherein it is necessary at times that the fluid flow through the passageway (at least at the location of the valve of the invention) in one direction and at other times in the opposite direction, and the valve is devised to permit this flow in opposite directions, and to reduce the pressure of the fluid in its flow in one of the directions. While a passageway of this characteristic is essential with the present invention, the invention is not otherwise limited, that is to say it is not limited to a power reverse gear mechanism, although it is especially adapted in such mechanism of the type having the same passageway for the flow of fluid to the cylinder and for the flow of fluid from the cylinder.

As the purpose of the reducing valve as aforesaid is to reduce the fluid pressure per square inch in the cylinder end opposite that containing the piston rod, the reducing valve is installed in the passageway connected to this end of the cylinder. In the present instance the valve is disposed in the passageway connecting the port 20 with the left hand end of the cylinder (Fig. 1), that is to say the end remote from the end containing the piston rod. This passageway comprises the two aligned passageways 8 and 22 and for convenience of construction the valve is disposed at the juncture of these two passageways. This permits part of the valve to be disposed in the wall of the cylinder and another part in the block 11 of the control valve 10. However, other constructions may be resorted to, all within the scope of the present invention, and broadly speaking it is only necessary that the fluid may flow in either direction at the reducing valve location. In the present instance however, and as will generally be the case, it is intended that the fluid flow in either direction throughout the passageway, as in the present case, through the passageway from the port 20 to the cylinder.

The reducing valve is indicated generally by the reference numeral 41 and comprises a chamber 42 which is provided by enlarging the passageway 8 at its upper end. The chamber 42 at its upper end, that is to say near the upper face 43 of the cylinder casting, provides a port 44 through which the fluid exhausting from the cylinder through the passageway 8 flows. A seat 45 connects the port 44 with the face 43. The seat is inclined facing in the direction of said flow. A valve element 46 controls the port 44. The valve element 46 has an inclined face 47 which is oppositely directed to and engages the seat 45 when the element is in closed position. The seat is circular and the element is adapted for movement from and to the seat to open and closed positions in a direction axially of the seat, as will presently more fully appear.

The passageway 22 is enlarged at its lower end, that is to say adjacent the face 43, to provide a chamber 48 larger than the element 46 to provide ample room for said flow of the fluid as it passes beyond the port 44. The valve element 46 has a body portion 49 on which the face 47 is formed, and a hub portion 50 extending upwardly from the body portion. The valve element is orificed throughout from end to end to provide a cylindrical bore 51 extending from the top of the hub portion part way through the body portion providing at its lower edge a port 52 through which the fluid flowing from the port 20 to the cylinder through the passageway 22 flows. It will be noted that this flow is in a direction opposite to the flow through the port 44 and it is the pressure of this fluid that is reduced in passing the port 52. The hub portion is provided with radial openings 53 for insuring free passage of the fluid in either direction. A seat 54 connects the port 52 with the lower end face of the valve element 46. It is inclined, facing in the direction of the last mentioned flow of the fluid, namely that from port 20 to the cylinder. Seats 45 and 54 are oppositely directed.

Another valve element 55 controls the port 52. This valve element has an inclined face 56 which is oppositely directed to and engages the seat 54 when the valve element 55 is in closed position. The seat 54 is circular and the element 55 is adapted for movement from and to said seat to open and closed positions in a direction axially of said seat 54. The valve element 55 comprises a body portion 57 on which the face 56 is provided, a hub portion 58, and a stem portion 59. The stem portion extends through and somewhat above the bore 51 and is of somewhat skeleton formation to permit the free flow of fluid through the port 52 when the valve element 55 is lowered to open position. To this end the stem portion 59 is provided with radial fins 60 which engage at their outer faces the face of the bore 51 to permit free axial sliding movement of the valve element 55 relative to the element 46 and to furthermore centralize the valve element 46 to insure proper seating thereof when closed.

The body portion 57 and hub portion 58 are disposed in the chamber 42 which is sufficiently larger than the body portion 57 and hub portion 58 to provide ample room for the flow of fluid in either direction, and the hub portion 58 is provided with radial fins 61 which engage at their outer faces the adjacent face of the chamber 42 to permit free axial sliding movement of the element 55, to centralize the valve element 55 to insure proper seating thereof when closed; and to insure the aforesaid centralizing of the valve element 46.

The hub portion 58 is provided with a socket 62 and in line with this socket the passageway 8 is bored to provide a socket 63. A coil spring 64 is disposed with its upper end portion in the socket 62, with its upper end bearing against the end wall of this socket, and with its lower end portion in the socket 63 with its lower end bearing against the end wall of this socket. This spring yieldingly urges element 55 upward to hold face 56 in air-tight engagement with seat 54 when element 55 is closed.

The passageway 22 above the chamber 48 is enlarged to provide a chamber 65 having a shoulder 66. A coil spring 67 is disposed in the chamber 65 with its upper end bearing upon the shoulder 66 and with its lower end bearing upon the upper face of the valve element 46 with its lower end portion surrounding the extended part of the stem portion 59. The two springs are thus securely mounted and they are of suitable strengths to insure proper operation of the valves. Spring 67 yieldingly urges element 46 downward to hold face 47 in airtight engagement with seat 45 when element 46 is closed.

The bottom of chamber 42 and the intermediate top wall of chamber 48 provide shoulders 68 and 69 respectively which limit the movement of the valve elements 55 and 46.

The operation of the reducing valve 41 is as follows:

Assume the piston 2 is at an adjusted position, for a certain distribution valve gear cut-off, with a balanced total air pressure thereon on each side thereof, and that the control valve is at its normal or central position and is of the type as shown in the drawing, providing in this position a slight lead at the admission edge of each port leading to the cylinder. The air pressure per square inch on the piston rod side (forward side) of the piston will be at source pressure and the air pressure per square inch on the other side of the piston (rear side) will be at a sufficiently reduced pressure, attained by the reducing valve, to produce the said total pressure balance.

Further assume that the piston is then moved in one or the other direction, either positively by the engineer, or by one of the disturbances aforementioned. The reducing valve 41 will then function. The reducing valve is controlled by the air pressures on the opposite sides thereof, in conjunction with the pressure characteristics of the respective springs. When the piston is at rest as first assumed, the reducing valve is in closed position separating the air in passageway 22 at source pressure from the air in passageway 8 at reduced pressure.

Assume the movement of the piston is forward and is produced by the engineer, or rearward and is produced by an aforesaid disturbance, the floating lever in the first instance swinging about the pivot pin 35 and in the other instance swinging about the pivot pin 40. The valve element 15 in either instance operates in the usual manner opening the port 21 for exhaust, thereby reducing the pressure forward of the piston, and the port 20 for admission. The valve element 55 is thereby lowered, opening port 52, and the source air passes from the passageway 22 through the passageway 8, into the rear end of the cylinder, adjusting the piston for the desired cut-off in the first instance and returning it to its proper position in the second instance, in the usual manner, at which the valve element 55 raises, closing port 52, with the air at the rear of the piston at the required reduced pressure. This reduction of pressure is dependent upon the air pressures on the opposite sides of the valve element 55 and the pressure characteristic of spring 64.

Next assume that the piston is moved rearward by the engineer or forward by an aforesaid disturbance, the floating lever swinging in a similar manner to that aforesaid. The valve element 15 operates to open port 20 for exhaust, thereby reducing the pressure rearward of the piston, and port 21 for admission. The valve element 46 is thereby raised, opening port 44, valve element 55 moving upward therewith as a unit, and the air at the rear of the piston exhausting through passageways 8 and 22 to the port 20 and finally to the atmosphere, air at source pressure entering the forward end of the cylinder through port 21 and passageways 23 and 9. The piston is thereby adjusted for the desired cut-off in the first instance or returned to its proper position in the second instance, in the usual manner, at which the valve element 46 descends, closing port 44, the valve element 55 descending therewith as a unit, with the air at the rear of the piston at the required reduced pressure. For the proper functioning (opening and closing of the port 44) of the valve element 46 careful consideration must be given, in designing the valve, to the various valve areas to be subjected to the air pressures on the opposite sides of the valve elements and the pressure characteristics of the springs 64 and 67.

It will thus be seen to attain the required reduction in pressure and the proper operation of the valve elements 46 and 55 to enable them to properly operate during adjustment or movement of the piston, the reducing valve must be suitably designed as to the effective air pressure surfaces on the opposite sides thereof and the yielding pressure characteristics of the springs.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A power reverse gear mechanism of the follow-up motor type comprising a power cylinder; a piston in said cylinder; a rod extending from said piston through one end of said cylinder, producing a lesser pressure area on the side of said piston adjacent said rod than on the opposite side; passageways leading from opposite ends of said cylinder; a control valve for air supply to both said passageways at the same pressure, the passageway at the end of said cylinder remote from said last mentioned rod serving to admit air to and exhaust air from said remote end; and a fluid pressure-reducing double flow valve for controlling pressure af air in said remote end, said reducing valve being disposed in said last mentioned passageway between said control valve and said remote end and having an automatically operable exhaust valve element opening in a direction away from said remote end and a spring resisting said opening, said reducing valve further having an automatically operable pressure-reducing valve element opening in a direction toward said remote end and a spring resisting said opening, said elements at their faces remote from said cylinder remote end being under pressure of the air coming from said control valve and at their opposite faces being under the pressure of the air in said cylinder remote end.

2. A power reverse gear mechanism of the follow-up motor type comprising a power cylinder; a piston in said cylinder; a rod extending from said piston through one end of said cylinder, producing a lesser pressure area on the side of said piston adjacent said rod than on the opposite side; passageways leading from opposite ends of said cylinder; a control valve for air supply to both said passageways at the same pressure, the passageway at the end of said cylinder remote from said rod serving to admit air to and exhaust air from said remote end; and a fluid pressure-reducing double flow valve for controlling pressure of air in said remote end, said reducing valve being disposed in said last mentioned passageway between said control valve and said remote end and having an exhaust port for said remote end, a seat adjacent said port facing away from said remote end, an automatically operable valve element for opening and closing said port, having a face oppositely directed to and engageable with said seat, an admission port for said remote end extending through said element within the bounds of said exhaust port and a seat adjacent said admission port facing toward said remote end, said reducing valve further having a spring yieldingly resisting opening of said element, an automatically operable pressure-reducing valve element for opening said admission port to effect supply air admission to said remote end and for closing said admission port to effect said pressure-reducing in said remote end, having a face oppositely directed to and engageable with said admission port seat, and adapted to move with said first mentioned element as a unit during opening and closing of said exhaust port, and another spring yieldingly resisting opening of said pressure-reducing element, whereby said exhaust port valve element opens away from said remote end by air pressure therein and said admission port valve element opens toward said remote end by pressure of said supply air coming from said control valve.

3. A power reverse gear mechanism of the follow-up motor type comprising a power cylinder; a piston in said cylinder; a rod extending from said piston through one end of said cylinder, producing a lesser pressure area on the side of said piston adjacent said rod than on the opposite side; passageways leading from opposite ends of said cylinder; a control valve for air supply to both said passageways at the same pressure, the passageway at the end of said cylinder remote from said rod serving to admit air to and exhaust air from said remote end; and a fluid pressure-reducing double flow valve for controlling pressure of air in said remote end, said reducing valve being disposed in said last mentioned passageway between said control valve and said remote end and having an exhaust port for said remote end, a seat adjacent said port facing away from said remote end, an automatically operable valve element for opening and closing said port, having a face oppositely directed to and engageable with said seat, an admission port for said remote end extending through said element within the bounds of said exhaust port and a seat adjacent said admission port facing toward said remote end, said reducing valve further having a spring disposed on the side of said element remote from said cylinder remote end, yieldingly resisting opening of said element, an automatically operable pressure-reducing valve element for opening said admission port to effect supply air admission to said remote end and for closing said admission port to effect said pressure-reducing in said remote end, having a face oppositely directed to and engageable with said admission port seat, and adapted to move with said first mentioned element as a unit during opening and closing of said exhaust port, and another spring disposed on the side of said pressure-reducing element adjacent said remote end yieldingly resisting opening of said pressure-reducing element, whereby said exhaust port valve element opens away from said remote end by air pressure therein and said admission port valve element opens toward said remote end by pressure of said supply air coming from said control valve, said opening of said pressure-reducing element being unaffected by said first mentioned spring and said opening of said first mentioned element being assisted by said other spring.

ROGER W. CLIFFORD.